UNITED STATES PATENT OFFICE.

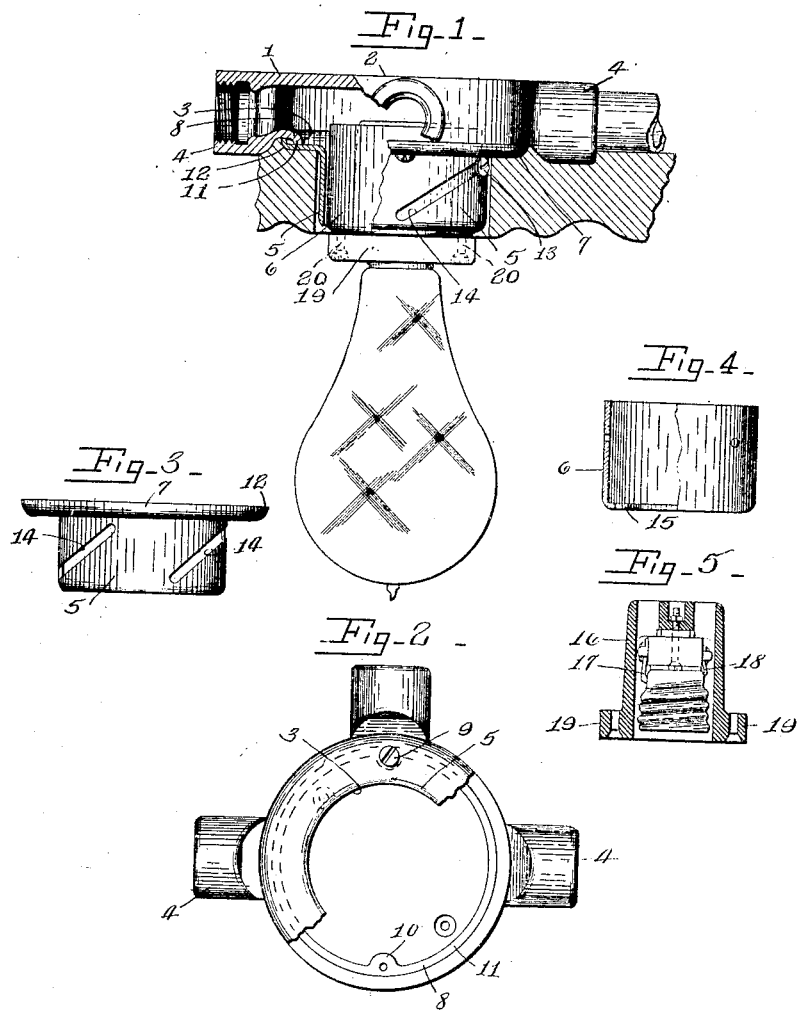

DANIEL C. GIDLEY, OF WINTHROP, MASSACHUSETTS, ASSIGNOR TO CROUSE-HINDS COMPANY, OF SYRACUSE, NEW YORK, A CORPORATION OF NEW YORK.

ELECTRIC-CONDUIT FITTING.

1,223,865. Specification of Letters Patent. Patented Apr. 24, 1917.

Original application filed October 6, 1910, Serial No. 585,599. Patent No. 1,180,838. Divided and this application filed April 10, 1916. Serial No. 90,147.

*To all whom it may concern:*

Be it known that I, DANIEL C. GIDLEY, a citizen of the United States, and a resident of Winthrop, in the county of Suffolk and State of Massachusetts, have invented a certain new and useful Electric-Conduit Fitting, of which the following is a specification.

My invention has for its object the production of an electric conduit fitting by which the electrical appliance supported thereby can be adjusted axially and easily adapted to different conditions and thicknesses of walls concealing the conduit work; and it consists in the combinations and constructions hereinafter set forth and claimed.

In describing this invention, reference is had to the accompanying drawing in which like characters designate corresponding parts in all the views.

Figure 1 is an elevation, partly broken away, of a preferable embodiment of my invention, the contiguous portions of the wall in which the fitting is embedded being also shown in section.

Fig. 2 is a top plan of this fitting, partly broken away, and parts being removed.

Figs. 3 and 4 are detail views of the sleeve members thereof, Fig. 4 being partly broken away.

Fig. 5 is a sectional view of the detached socket member.

This application is a division of my pending application, Sr. No. 585,599, filed Oct. 6, 1910, matured into Patent No. 1,180,838, April 25, 1916, and the object of the present application is particularly simple and efficient means by which the electrical appliance or lamp socket is adjustably supported.

1 is the hollow body of my fitting, said body being usually formed of cast metal and having one or more passages for the inlet and outlet of electric wires. The body 1 is here shown as cylindrical in plan and as having a flat bottom 2 and an opening 3 in its wall opposite the bottom and also one or more internally threaded nipples 4 for connection to conduits which inclose the service wires.

The means by which the electrical appliance is supported and readily adjusted axially to different thicknesses and conditions of walls concealing the conduit work, comprises inner and outer sleeve members 5, 6, one being fixed to the body 1 and the other adjustable axially relatively to the fixed member.

In this embodiment of my invention, the outer sleeve member is fixed and the inner sleeve member adjustable, and the outer member is provided with an external annular flange 7 which rests upon the margin 8 of the wall of the body 1 around the opening 3, and is secured thereto by screws 9 extending through said flange into lugs 10 provided on said margin 8.

Usually the inner edge of the margin 8 is formed with an outwardly extending lip 11 which engages the inner face of the flange 7, and the flange 7 is formed with a lip 12 at its outer edge which engages the outer face of the margin 8. This mode of connecting the body and the outer sleeve member constitutes the subject-matter of my application previously referred to of which this is a division.

The adjustable inner sleeve member 6 is held in its adjusted position by clamping means as screws 13 extending through spiral slots 14 formed in the outer sleeve member, the screws 13 threading into the inner sleeve 6. By loosening the screws 13 and turning the inner sleeve member, the screws will move along the slots from high to low points thereof or vice versa, and thus arrange the inner sleeve member either farther into or out of the outer sleeve member.

The outer sleeve member 5 may be provided with one of these slots, but in order to more firmly support the inner sleeve member 6, the outer sleeve member 5 is usually provided with three of such slots. The inner sleeve member 6 is provided with an inturned flange 15 at its outer end.

16 is a socket for the electrical appliance as a lamp, said socket extending into the inner member 6 and having terminals 17, 18 at its inner end, for connection with the wires within the body 1. The socket is also provided with the usual central and sleeve terminals which engage the terminals of the electrical appliance.

The cap is constructed to receive sockets of the standard makes and sizes, and said sockets are usually provided at their outer ends with exterior annular flanges as the flange 19, which laps upon the inturned flange 15 of the inner member 6 and is secured thereto by screws 20. The periphery of the flange 19 is of less diameter than the interior of the outer sleeve member 5 so that the flange may, if necessary, extend partly within said outer sleeve member.

In some instances, especially in concrete buildings, the conduits and fittings are embedded in the walls, as illustrated in Fig. 1, and the distances vary at which the conduits and the bodies of the fittings are located below the surfaces of the walls, and in use by adjusting the inner sleeve member axially, the flange 19 of the socket 16 can be arranged close to the plane of the outer face of the wall or ceiling in which the conduit work is embedded, so that the electrical appliance presents a neat and pleasing appearance.

If the wall is being plastered, the position of the sleeve 6 is determined as the plaster is spread toward the sleeve 5 and the screw set before the plaster is applied around the sleeve. In concrete walls, the sleeve 6 is adjusted to come flush with, or in proper relation to, the shorings which confine the concrete until it hardens.

Although my invention is particularly applicable in connection with concealed conduit work, conditions may arise in which it may be used advantageously in exposed or other forms of work.

What I claim is:—

1. The combination of an electric conduit fitting comprising a hollow body having means for connection with a conduit and an opening in one wall thereof, a cap for the opening, the cap comprising inner and outer telescoping sleeve members, one of said members being fixed to the body and the other being adjustable axially of the fixed member, a socket extending into the cap and supported by the adjustable sleeve member, the outer sleeve member being formed with a spiral slot, and clamping means extending through the slot and into the inner sleeve member for holding the movable sleeve member in its adjusted position, substantially as and for the purpose described.

2. The combination of an electric conduit fitting comprising a hollow body having means for connection with a conduit and an opening in one wall thereof, a cap for the opening including inner and outer telescoping sleeve members, the outer member being fixed to the body and formed with a spiral slot and the inner member being adjustable axially and formed with an inturned flange at its outer end, a screw extending through said slot and turning into the inner sleeve member for holding the inner sleeve member in its adjusted position, and a socket for an electrical appliance extending into the inner sleeve member and adapted to be connected to the wires in the body, the socket having a flange lapping the inturned flange of the inner sleeve member and engaging the outer face thereof and being secured thereto, substantially as and for the purpose specified.

In testimony whereof, I have hereunto signed my name, at Syracuse, in the county of Onondaga, and State of New York, this 7th day of April, 1916.

DANIEL C. GIDLEY.

Copies of this patent may be obtained for five cents each, by addressing the "Commissioner of Patents, Washington, D. C."